United States Patent
Hwang et al.

(10) Patent No.: US 6,845,421 B2
(45) Date of Patent: Jan. 18, 2005

(54) MULTIMEDIA MODULAR CARD, DEVICE FOR OPERATING THE SAME, AND INTEGRATED MULTIMEDIA SYSTEM

(75) Inventors: Kyo-Jong Hwang, Seoul (KR); Young-Keun Kim, Bucheon (KR); Yoon-Soo Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 454 days.

(21) Appl. No.: 09/938,503

(22) Filed: Aug. 27, 2001

(65) Prior Publication Data

US 2002/0049876 A1 Apr. 25, 2002

(30) Foreign Application Priority Data

Aug. 25, 2000 (KR) .......................................... 2000-49734

(51) Int. Cl.⁷ .............................................. G06F 13/14
(52) U.S. Cl. ........................ 710/305; 710/309; 710/313
(58) Field of Search ........................ 710/63, 100, 305, 710/307, 309, 313; 711/5, 103, 102, 104, 170; 361/737, 783; 365/52, 185.33

(56) References Cited

U.S. PATENT DOCUMENTS

| | | | |
|---|---|---|---|
| 5,430,859 A | * | 7/1995 | Norman et al. ............. 711/103 |
| 5,646,904 A | * | 7/1997 | Ohno et al. .................. 365/233 |
| 5,790,815 A | * | 8/1998 | Swanstrom et al. ........ 710/309 |
| 5,867,417 A | * | 2/1999 | Wallace et al. ............... 365/52 |
| 5,928,347 A | * | 7/1999 | Jones .......................... 710/305 |
| 6,535,422 B2 | * | 3/2003 | Goto et al. ............ 365/185.11 |
| 6,601,056 B1 | * | 7/2003 | Kagle et al. .................... 707/1 |
| 6,643,730 B2 | * | 11/2003 | Okumura et al. .............. 711/5 |
| 6,669,487 B1 | * | 12/2003 | Nishizawa et al. ........... 439/60 |

* cited by examiner

Primary Examiner—Khanh Dang
(74) Attorney, Agent, or Firm—Sughrue Mion, PLLC

(57) ABSTRACT

The present invention discloses a multimedia modular card, a device for operating the same, and an integrated multimedia system. The multimedia modular card includes a bus interface removably formed in the device for operating the modular card, for transmitting/receiving data to/from the device, a local controller for controlling the operation of the multimedia modular card, according to an input signal from the bus interface, and a local processor programmed to perform functions corresponding to previously-set multimedia support types, and operated by the local controller. Accordingly, the user can embody a desired multimedia system by selectively mounting the multimedia modular card having a specific function on the system.

33 Claims, 5 Drawing Sheets

MULTIMEDIA MODULAR CARD, DEVICE FOR OPERATING THE SAME, AND INTEGRATED MULTIMEDIA SYSTEM

BACKGROUND OF THE INVENTION

1. Field of the Invention

The present invention relates to a multimedia player, and more particularly, to a multimedia modular card, a device for operating the same, and an integrated multimedia system. The present application is based on Korean Patent Application No. 2000-49734, which is incorporated herein by reference.

2. Description of the Related Art

According to rapid developments in multimedia player technologies, MP3 (Motion Picture Experts Group Layer-3 Audio) players, MPEG (Motion Pictures Experts Group) decoders, and Bluetooth and CDMA (Code Division Multiple Access) type cellular phones have been recently developed and used.

FIG. 1 is a block diagram illustrating a conventional multimedia player.

As illustrated in FIG. 1, the conventional multimedia player 10 includes a CPU 1, a ROM 2, a DRAM 3, an I/O unit 4, a memory card controller 5, an LCD 7 connected to the CPU 1 through a local bus, a DAC (Digital-to-Analog Converter) 8 and a speaker 9. The multimedia player 10 is connected with a memory card 6.

The I/O unit 4 inputs a desired function of the user. The I/O unit 4, which is determined by the type of the multimedia player, is used for selecting an operation button, such as a play button or stop button, or a menu displayed on a screen.

In addition, a memory card 6 stores encoded audio data, video data, and digital data stream. The user selects a desired memory card 6 and installs it in the multimedia player 10.

When power is supplied to the multimedia player 10, the CPU 1 is reset by a boot program stored in the ROM 2.

The memory card controller 5 reads encoded data stored in the memory card 6.

The encoded data read from the memory card 6 is temporarily stored in the DRAM 3, decoded by a decoder program, and divided into video data and audio data.

The CPU 1 transmits the decoded video data to the LCD 7, where the decoded video data is reproduced as an image signal. In addition, the CPU 1 transmits the decoded audio data to the DAC 8, where the digital signal is converted into an analog signal. The converted signal is transmitted to the speaker 9. The speaker 9 reproduces the signal as an audio signal.

In the conventional multimedia player, the programs stored in the CPU 1 and the ROM 2 merely drive devices connected to the local bus. Accordingly, an external device cannot be connected to the local bus, and thus a previously-designed function can be added or deleted to/from the system.

On the other hand, only the memory card is removably disposed at the conventional multimedia player. It is thus impossible to add additional functions to the system, except for the previously-designed functions. As a result, it is difficult to satisfy the user's demand for a multi-functional system.

In order to perform multiple functions, the system must be provided with the respective multimedia players, namely the MP3 player, a MPEG decoder, a Bluetooth module equipped device and cellular phone. Therefore, the system is not portable.

Moreover, it causes additional costs for buying the respective devices.

SUMMARY OF THE INVENTION

Accordingly, it is a primary object of the present invention to provide a multimedia modular card that can be removably disposed at a device for operating and controlling the modular card, and which can perform functions corresponding to previously-set multimedia support types.

Another object of the present invention is to provide a device for operating a modular card which can removably include the modular card, and operate and control a plurality of modular cards.

Still another object of the present invention is to provide an integrated multimedia system, which can selectively perform desired functions of the user, by easily connecting or removing a multimedia modular card having a certain function, to/from the system.

In order to achieve the above-described objects of the present invention, there is provided a multimedia modular card inserted into a device for operating the modular card, including: a bus interface removably formed in the device for operating the modular card, for transmitting/receiving data to/from the device; a local controller for controlling the operation of the multimedia modular card, according to an input signal from the bus interface; and a local processor programmed to perform functions corresponding to previously-set multimedia support types, and operated by the local controller. The local processor, such as a USB (Universal Serial Bus) controller, can be used to control a display unit of the device for operating the multimedia modular card.

In addition, there is provided a device for operating a modular card, including: an external bus removably formed from the multimedia modular card, for receiving/transmitting data from/to the multimedia modular card; a main controller for generating a signal for controlling the multimedia modular card through the external bus; and a bus arbitrator for arbitrating an external bus using right of a plurality of multimedia modular cards inserted into the device for operating the multimedia modular card. The device for operating the multimedia modular card can include a camera, from which a video signal can be processed by the local processor of the multimedia modular card.

There is also provided an integrated multimedia system, at least one multimedia modular card being inserted into a device for operating the modular card, wherein the multimedia modular card includes: a bus interface removably formed in the device for operating the modular card, for transmitting/receiving data to/from the device; a local controller for controlling the operation of the multimedia modular card, according to an input signal from the bus interface; and a local processor programmed to perform functions corresponding to previously-set multimedia support types, and operated by the local controller; and wherein the device for operating the modular card, includes: an external bus interface removably formed from the multimedia modular card, for receiving/transmitting data from/to the multimedia modular card; a main controller for generating a signal for controlling the multimedia modular card through the external bus; and a bus arbitrator for arbitrating an external bus using right of a plurality of multimedia modular cards inserted into the device for operating the multimedia modular card.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A multimedia modular card, device for operating the same, and integrated multimedia system, in accordance with preferred embodiments of the present invention, will now be described in detail with reference to the accompanying drawings.

Figure 1:
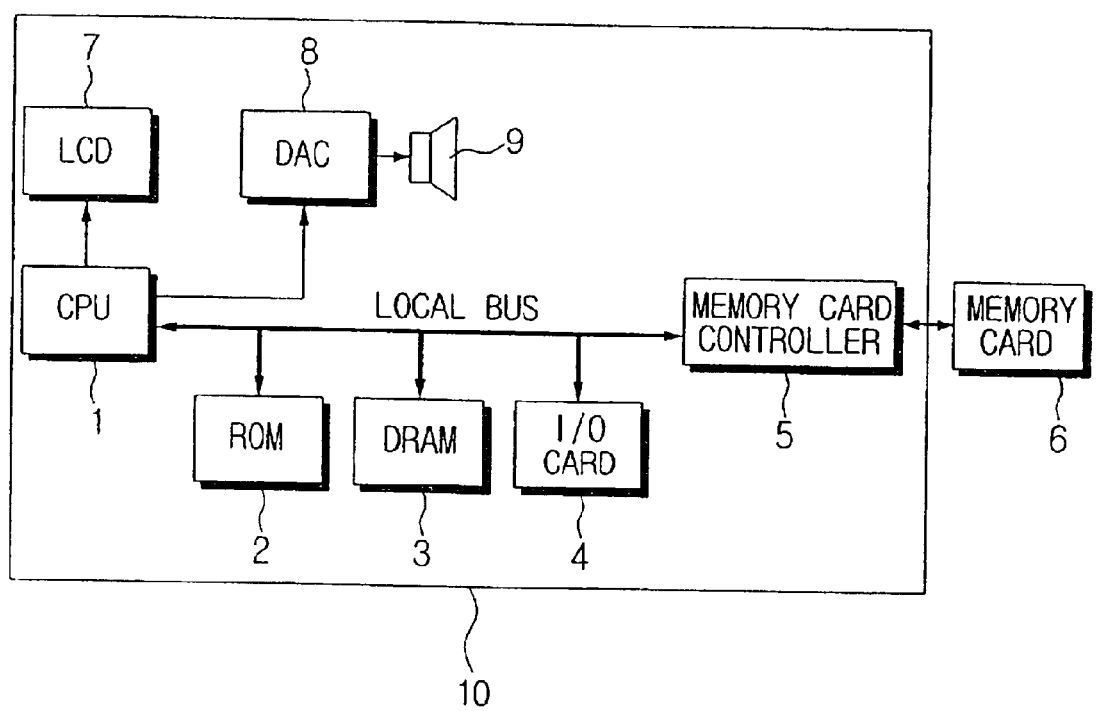
FIG. 1 is a block diagram illustrating a conventional multimedia player.
Figure 2:
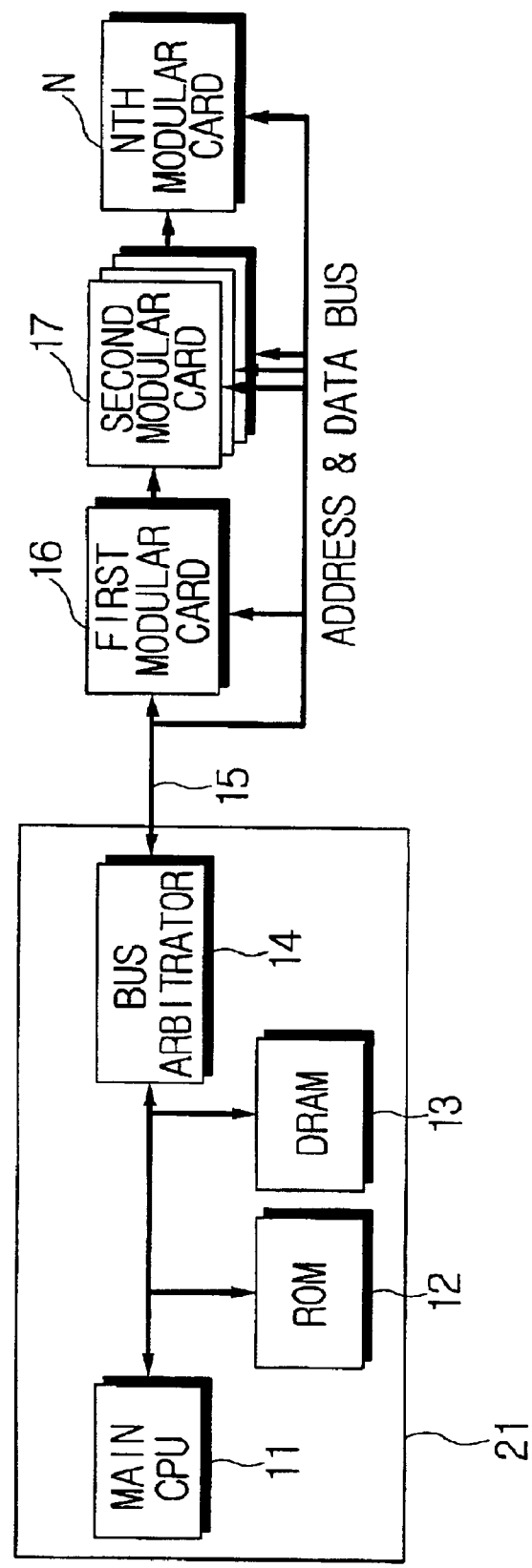
FIG. 2 is a block diagram illustrating an integrated multimedia system in accordance with the present invention.

FIG. 2 is a block diagram illustrating an integrated multimedia system in accordance with preferred embodiments of the present invention.

In the integrated multimedia system, at least one modular card 16, 17, . . . , N is connected to a host 21, namely a device for operating the modular card through an external bus 15.

Preferably, exemplary modular cards include MP3 coding and decoding, audio advanced coding and decoding, WMA (Windows Media Audio) coding and decoding, MPEG coding and decoding, Bluetooth communication, CDMA module, a smart media card and secure media card.

According to the operation state, the modular card is classified as a master card and a slave card. The master card demands use of the external bus and controls the slave modular cards.

The host 21 includes a main CPU 11, ROM 12, DRAM 13, bus arbitrator 14, and external bus 15.

Further, the host 21 includes a slot (not shown). Thus, the modular card can be inserted into the slot.

The host 21 also includes a switch for switching connection between the slot and the external bus. When the modular card is inserted into the slot, the switch is turned off.

The main CPU 11 is reset according to a program stored in the ROM 12. The DRAM 13 stores data shared by the main CPU 11 and the master modular card. If necessary, the DRAM 13 is employed as a data buffer.

When a plurality of modular cards are inserted, the bus arbitrator 14 arbitrates bus access of the modular cards.

On the other hand, the bus arbitrator 14 stores priorities of the master modular cards using the external bus 15.

When the bus arbitrator 14 receives a demand for the external bus using right, if the use of the external bus 15 is finished or another modular card having a higher priority does not demand the external bus using right, the bus arbitrator 14 provides the external bus using right to the corresponding modular card through a *BGNT signal.

Accordingly, when receiving the demand for the external bus using right from at least two master modular cards, the bus arbitrator 14 provides the external bus using right to the master modular card having the higher priority.

The operation of the integrated multimedia system will now be described.

When power is supplied to the host 21, the main CPU 11 is reset according to a boot program stored in the ROM 12. The main CPU 11 resets the modular cards 16–N connected to the external bus 15, and reads information about functions and properties of the modular cards 16–N, namely identification information and individual operation conditions, from the respective modular cards 16–N. Thereafter, the main CPU 11 waits for an input command of the user.

When the user inputs a signal through an I/O unit(not shown) connected to the host 21, the main CPU 11 recognizes which of the modular cards connected to the host 21 must perform an operation, according to the input signal, and transmits a command to a local CPU 25 of the corresponding modular card.

Figure 3:
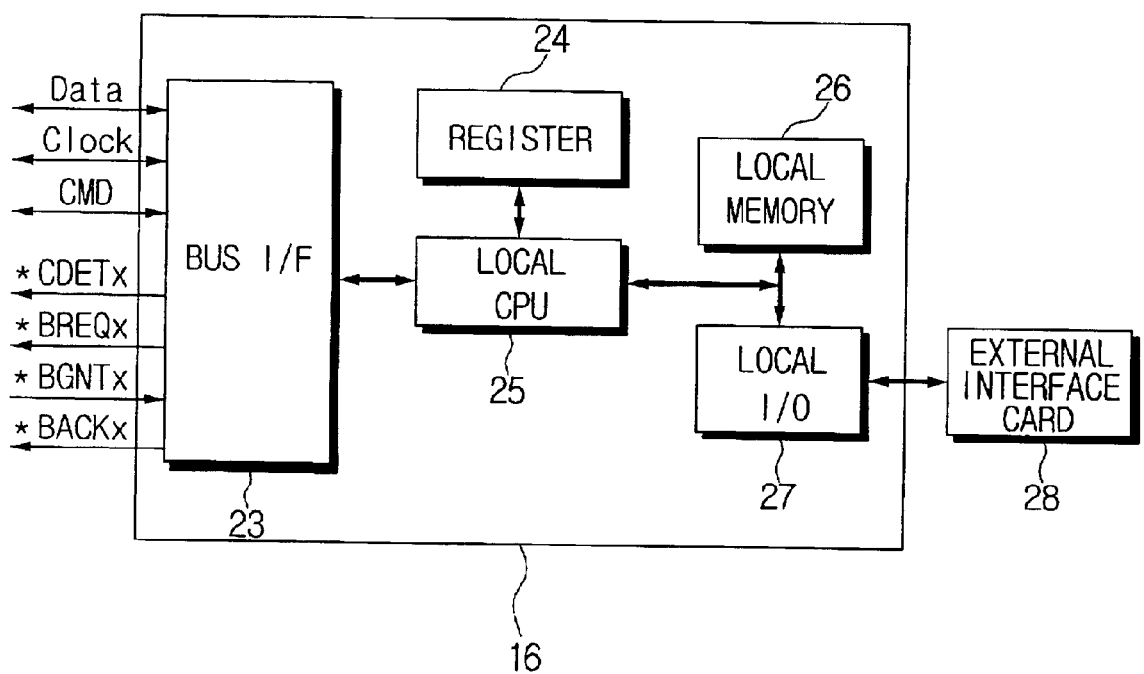
FIG. 3 is a block diagram illustrating the modular card according to a preferred embodiment of the present invention.

FIG. 3 is a block diagram illustrating the modular card, according to a preferred embodiment of the present invention.

The modular card includes a bus interface 23, register 24, local CPU 25, local memory 26, and local I/O unit 27.

The modular card employs different units in the master and slave modes.

When the modular card is in the slave mode, the local CPU 25 controls the bus interface 23, the register 24, the local memory 26 and the local I/O unit 27, according to a command from an external master card.

However, when the modular card is in the master mode, the local CPU 25 controls the external bus 15, as well as the other units in the modular card, namely the bus interface 23, the register 24, the local memory 26, and the local I/O unit 27.

The bus interface 23 inputs/outputs signals for connection to the main CPU 11 of the host 21 or the external modular card through the external bus 15, such as a *BREQx signal, a *BGNTx signal, a *BACKx signal, a *CDETx signal, a CMD signal, or a Clock signal and data.

The register 24 reads and stores identification information of the modular card inserted into the device for operating the multimedia modular card.

The local memory 26 is used in the modular card, and stores the command for operating the local CPU 25.

The local I/O unit 27 is operated by the local CPU 25. For instance, when the modular card is a MP3 player, a MP3 decoder is used as the local I/O unit 27, and when the modular card is an MPEG4 player, an MPEG4 decoder is used as the local I/O unit 27.

The external interface card 28 serves to add various functions to the modular card.

A signal line of the modular card will now be described with reference to FIG. 3.

The modular card includes a line for inputting/outputting data, a Clock signal, a CMD signal, a *CDETx signal, a *BREQx signal, a *BGNTx signal, and a *BACKx signal.

Here, a *BREQx signal demands use of the external bus 15 from the bus arbitrator 14.

A *BGNTx signal allows the modular card to employ the external bus 15.

A *BACKx signal is outputted from the modular card using the external bus 15, to a succeeding modular card. When the master card outputs a BACK signal in a low state, it implies that the master card is using the external bus 15.

A *CDETx signal recognizes insertion of the modular card. When insertion of the modular card is recognized by the *CDETx signal, power is supplied to the modular card.

A CMD signal transmits a command from the host and a response from the modular card.

The operation of the integrated multimedia system of FIG. 2 will now be explained.

First, the operation of the integrated multimedia system when two modular cards, namely one master card and one slave card, are inserted, will be explained.

Here, the master card is the modular card 16 having an MP3 player function and the slave card is the modular card 17 storing audio data, such as music, or the like.

The MP3 player card 16 reads data from the memory card 17, decodes the data and outputs an audio signal through the speaker.

When the modular cards 16, 17 are inserted, the bus arbitrator 14 confirms insertion of the modular cards 16, 17, according to the *CDETx signal, and supplies power to the inserted modular cards.

The receiving powers of modular cards 16, 17 are reset to an idle state. The identification information and individual operation conditions of the internal registers 24 of the inserted modular cards 16, 17, are transmitted to the main CPU 11 of the host 21, through a data bus.

The bus interface 23 of the MP3 player card 16 outputs a *BREQ signal in a high state, thereby demanding an external bus using right to use the bus arbitrator 14 of the host 21.

The bus arbitrator 14 provides the external bus using right through a *BGNT signal.

When a command is input from the host 21 through the bus interface 23, the input command controls the local I/O unit 27.

According to the input signal from the local I/O unit 27, the local CPU 25 inputs/outputs data in the memory card 17 through the data bus.

In addition, the MP3 player card 16 generates a command for reading data in the memory card 17.

An address command is generated to select a data transmission object, and a data block length command is also generated to select a read cycle type from a stream type, multiple type and single type.

A read block command is generated to perform the data read cycle.

A data write cycle is processed in a similar manner to the data read cycle. An order of generating the aforementioned commands will now be described.

First, a data transmission object is selected by generating the address command. A write cycle type is selected from the stream type, multiple type and single type, according to the data block length command.

The data write cycle is performed by generating a write block command.

In the modular card, data is transmitted through the data bus, and a clock signal from the master modular card is synchronized with the CMD signal and the data bus.

The slave modular card responds to the other commands from the master modular card, and thus notifies of the successful transmission.

Next, the operation of the integrated multimedia system will be described, where a plurality of modular cards are inserted into the external bus of the host.

Figure 4:
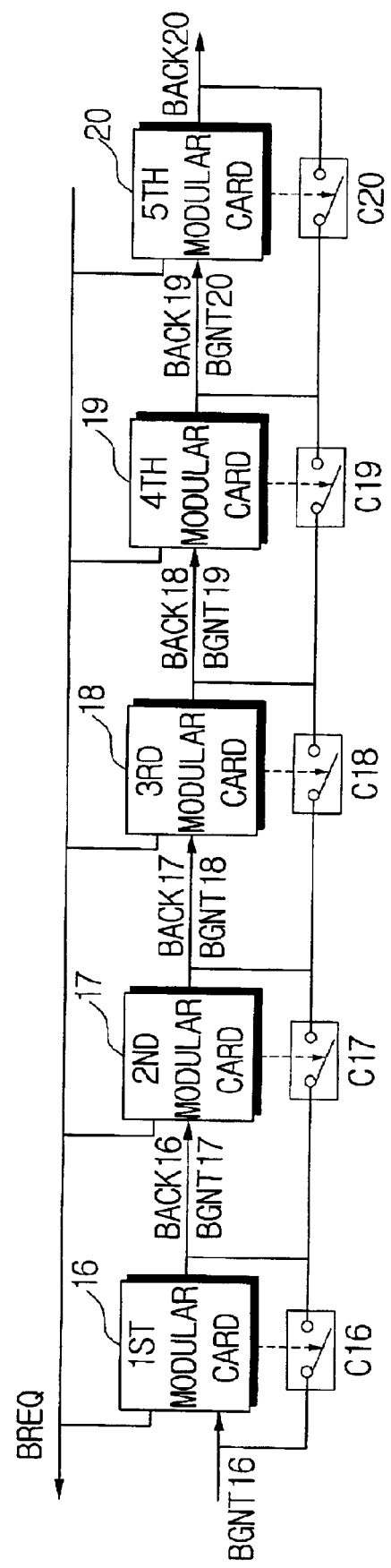
FIG. 4 shows the case where the plurality of modular cards are inserted into the device for operating the modular card.

FIG. 4 shows the case where the plurality of modular cards are inserted into the device for operating the modular card.

As depicted in FIG. 4, the first to fifth modular cards 16–20 are connected in a row through the respective *BGNTx and *BACKx lines.

Since the first to fifth modular cards 16–20 are inserted, connectors C16–C20 corresponding to the respective modular cards, are turned off.

Therefore, the modular cards shown in FIG. 4 are arbitrated according to a daisy chain configuration.

According to the daisy chain configuration, when a plurality of bus masters are connected, if the bus master on a lower layer receives a bus allowance signal from the bus master on an upper layer, it can access the bus.

As illustrated in FIG. 4, the first modular card 16 is operated after receiving the external bus allowance signal *BGNT16. Here, *BACK16 signal of the first modular card 16 is output in a low state, and transmitted to the *BGNT17 port of the second modular card 17.

When the *BGNT17 signal is in a low state, the second modular card 17 recognizes that use of the external bus 15 of the first modular card 16 is not finished, and thus does not demand use of the external bus 15. However, when *BGNT17 signal is in a high state, the second modular card 17 can demand use of the external bus 15.

The third to fifth modular cards 18–20 recognize the use completion state of the external bus 15 in the same manner. At last, the bus arbitrator 14 monitors the *BACK20 signal from the fifth modular card 20, and thus judges that use of the external bus 15 is finished.

Figure 5:
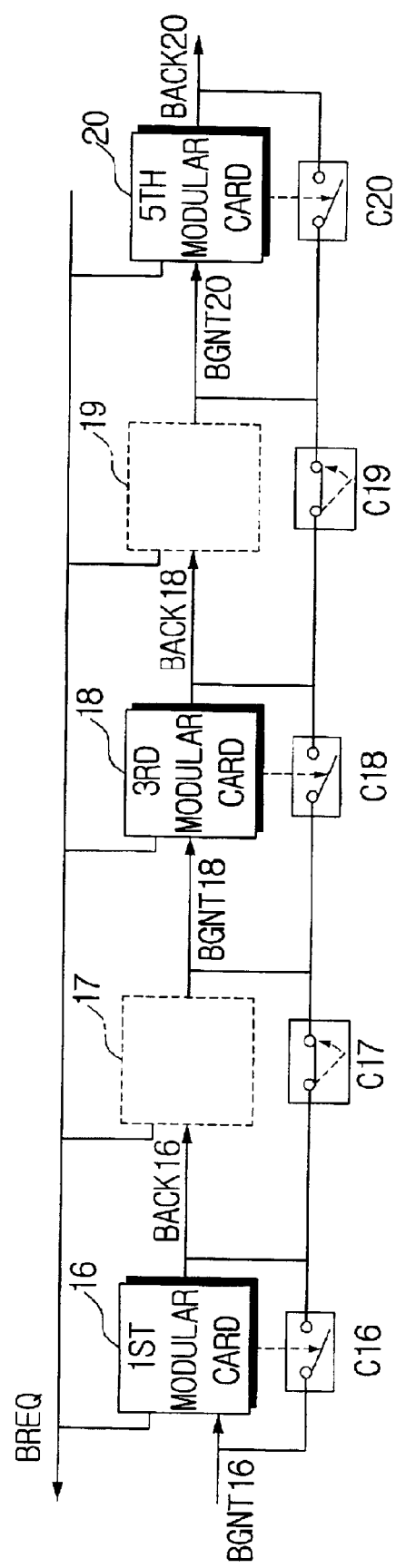
FIG. 5 shows the case where some of the modular cards are removed from the FIG. 4.

On the other hand, in the connection state of the modular cards shown in FIG. 4, if the user removes the second modular card 17 and the fourth modular card 19, the main CPU 11 of the host 21 detects removal of the second and fourth modular cards 17, 19, and turns on the connectors C17, C19 corresponding to the second and fourth modular cards 17, 19, as shown in FIG. 5.

As depicted in FIG. 5, the first modular card 16 passes through the second modular card 17, and then connects to the third modular card 18.

When the modular card is removed from the external bus 15, the connection state is maintained by the connectors, thereby preventing destruction of the daisy chain configuration.

When the first modular card 16 is operated after receiving the external bus using allowance signal, and outputs the *BACK16 signal in a low state, if *BGNT18 signal is in a low state, the third modular card 18 recognizes that use of the external bus 15 is not finished, and thus does not demand use of the external bus 15. However, when *BGNT18 signal is in a high state, the third modular card 18 can demand use of the external bus 15.

The third modular card 18 and the fifth modular card 20 are operated in the same manner.

On the basis of the modular card information and the information from the user, the main CPU 11 re-constitutes the modular card to perform necessary functions.

Although the preferred embodiments of the present invention have been described, it is understood that the present invention should not be limited to these preferred embodiments, but various changes and modifications can be made by one skilled in the art within the spirit and scope of the present invention as hereinafter claimed.

For example, in this embodiment, the daisy chain configuration is used as the bus arbitration method of the modular cards inserted into the device for operating the multimedia modular card. However, a polling method and a priority encoder/decoder may be employed.

In addition, in accordance with the present invention, the MP3 player is exemplified as the modular card. However, the modular card may be selected from MP3 coding and decoding, audio advanced coding and decoding, WMA coding and decoding, MPEG coding and decoding, Bluetooth communication, CDMA module, and a smart media card and secure media card.

As described above, the present invention provides the multimedia modular card, the device for operating the same, and the integrated multimedia system. Therefore, the user can embody a desired multimedia system by selectively mounting the multimedia modular card having a specific function, on the device for operating the modular card.

According to the user's need, the modular card can be inserted or removed. Therefore, the user carries only the device for operating the modular card and a necessary modular card. Thus, the system can be compact-sized.

Moreover, the high-priced and relatively large-sized units, such as the I/O unit and display unit, are shared in the device for operating the modular card, thereby cutting down the cost and reducing the size of the device.

What is claimed is:

1. A multimedia modular card inserted into a device for operating the multimedia modular card, comprising:
    a bus interface removably connected to the device for operating the multimedia modular card, for transmitting/receiving data to/from the device;
    a local controller for controlling an operation of the multimedia modular card, according to an input signal from the bus interface; and
    a local processor programmed to perform functions corresponding to previously-set multimedia support types, and operated by the local controller;
    wherein the multimedia card is connected to an external interface unit for connecting the local processor to an external device.

2. The multimedia modular card according to claim 1, wherein the local processor encodes or decodes an audio signal.

3. The multimedia modular card according to claim 1, wherein the local processor encodes or decodes a video signal.

4. The multimedia modular card according to claim 1, wherein the local processor processes Bluetooth communication with other devices performing wireless communication with the device for operating the multimedia modular card.

5. The multimedia modular card according to claim 1, wherein the device for operating the multimedia modular card comprises a display unit, and the local processor controls the display unit.

6. The multimedia modular card according to claim 1, wherein the local processor performs a data read/write operation according to a read/write signal from the device for operating the multimedia modular card.

7. The multimedia modular card according to claim 1, wherein the local processor is a USB (Universal Serial Bus) controller.

8. The multimedia card according to claim 1, wherein said device and said device are different devices.

9. A multimedia modular card inserted into a device for operating the multimedia modular card, comprising:
    a bus interface removably connected to the device for operating the multimedia modular card, for transmitting/receiving data to/from the device;
    a local controller for controlling an operation of the multimedia modular card, according to an input signal from the bus interface; and
    a local processor programmed to perform functions corresponding to previously-set multimedia support types, and operated by the local controller, wherein the device for operating the multimedia modular card comprises a camera, and the local processor processes a video signal from the camera.

10. A device for operating at least one multimedia modular card, comprising:
    an external bus removably connected to said at least one multimedia modular card, for receiving/transmitting data from/to said at least one multimedia modular card;
    a main controller for generating a signal for controlling said at least one multimedia modular card through the external bus; and
    a bus arbitrator for arbitrating an external bus using right of a plurality of multimedia modular cards, including said at least one multimedia modular card, inserted into the device for operating said at least one multimedia modular card,
    wherein the multimedia card comprises a local processor and is connected to an external interface unit for connecting the local processor to the device.

11. The device according to claim 10, further comprising an input unit for generating a key input signal of a user, and outputting it to the main controller.

12. The device according to claim 11, wherein, when said at least one multimedia modular card is connected to the external bus, the main controller reads identification information and individual operation conditions from a connected said at least one multimedia modular card, reads an input signal from the input unit, and operates one of said plurality of multimedia modular cards, including said at least one multimedia modular card, corresponding to the input signal.

13. The device according to claim 11, wherein, if the bus arbitrator receives a demand for the external bus using right requested from one of said plurality of multimedia modular cards when none of said plurality of multimedia modular cards are using the external bus, the bus arbitrator provides the external bus using right to said one of said plurality of multimedia modular cards.

14. The device according to claim 11, wherein, if the bus arbitrator receives a demand for the external bus using right requested from one of said plurality of multimedia modular cards when another one of said plurality of multimedia modular cards is using the external bus, the bus arbitrator provides the external bus using right to the requesting said one of said plurality of multimedia modular cards after said another one of said plurality of multimedia modular cards finishes using the external bus.

15. The device according to claim 11, wherein the bus arbitrator stores priorities of said plurality of multimedia modular cards using the external bus, provides the external bus using right to one of at least two of said plurality of multimedia modular cards having a higher priority of said at least two of said plurality of multimedia modular cards, when receiving a demand for the external bus using right from said at least two of said plurality of multimedia modular cards.

16. An integrated multimedia system having one or more multimedia modular cards being inserted into a device for operating said one or more multimedia modular cards, wherein each of said one or more multimedia modular cards comprises:
    a bus interface removably connected to the device for operating said one or more multimedia modular cards, for transmitting/receiving data to/from the device for operating said one or more multimedia modular cards;

a local controller for controlling an operation of said one or more multimedia modular cards, according to an input signal from the bus interface; and a local processor programmed to perform functions corresponding to previously-set multimedia support types, and operated by the local controller; and wherein the device for operating said one or more multimedia modular cards, comprises:

an external bus interface removably connected to said one or more multimedia modular cards, for receiving/transmitting data to/from said one or more multimedia modular cards;

a main controller for generating a signal for controlling said one or more multimedia modular cards through an external bus; and a bus arbitrator for arbitrating an external bus using right of a plurality of multimedia modular cards, including said one or more multimedia modular cards, inserted into the device for operating said one or more multimedia modular card, wherein the multimedia card is connected to an external interface unit for connecting the local processor to an external device.

17. The integrated multimedia system according to claim 16, wherein the local processor encodes or decodes an audio signal.

18. The integrated multimedia system according to claim 16, wherein the local processor encodes or decodes a video signal.

19. The integrated multimedia system according to claim 16, wherein the local processor processes Bluetooth communication with other devices performing wireless communication with the device for operating said one or more multimedia modular cards.

20. The integrated multimedia system according to claim 16, wherein the device for operating said one or more multimedia modular cards comprises a display unit, and the local processor controls the display unit.

21. The integrated multimedia system according to claim 16, wherein the local processor performs a data read/write operation, according to a read/write signal from the device for operating said one or more multimedia modular cards.

22. The integrated multimedia system according to claim 16, wherein the local processor is a USB controller.

23. The integrated multimedia system according to claim 16, wherein the device for operating said one or more multimedia modular cards further comprises an input unit for generating a key input signal of a user, and outputting it to the main controller.

24. The integrated multimedia system according to claim 23, wherein the main controller reads an input signal from the input unit, and operates one of said plurality of multimedia modular cards, corresponding to the signal.

25. The integrated multimedia system according to claim 16, wherein, if the bus arbitrator receives a demand for the external bus using right requested from one of said plurality of multimedia modular cards, including said one or more multimedia modular cards, when none of said plurality of multimedia modular cards are using the external bus, the bus arbitrator provides the external bus using right to the requesting said one of said plurality of multimedia modular cards.

26. The integrated multimedia system according to claim 16, wherein, if the bus arbitrator receives a demand for the external bus using right requested from one of said plurality of multimedia modular cards, including said one or more multimedia modular cards, when another one of said plurality of multimedia modular cards is using the external bus, the bus arbitrator provides the external bus using right to requesting said one of said plurality of multimedia modular cards after said another one of said plurality of multimedia modular cards finishes using the external bus.

27. The integrated multimedia system according to claim 16, wherein the bus arbitrator stores priorities of said plurality of multimedia modular cards, including said one or more multimedia modular cards, using the external bus, and provides the external bus using right to one of at least two of said plurality of multimedia modular cards having a higher priority of said at least two of said plurality of multimedia modular cards, when receiving the demand for the external bus using right from said at least two of said plurality of multimedia modular cards.

28. An integrated multimedia system having one or more multimedia modular cards being inserted into a device for operating said one or more multimedia modular cards, wherein each of said one or more multimedia modular cards comprises:

a bus interface removably connected to the device for operating said one or more multimedia modular cards, for transmitting/receiving data to/from the device for operating said one or more multimedia modular cards;

a local controller for controlling an operation of said one or more multimedia modular cards, according to an input signal from the bus interface; and a local processor programmed to perform functions corresponding to previously-set multimedia support types, and operated by the local controller; and wherein the device for operating said one or more multimedia modular cards, comprises:

an external bus interface removably connected to said one or more multimedia modular cards, for receiving/transmitting data to/from said one or more multimedia modular cards;

a main controller for generating a signal for controlling said one or more multimedia modular cards through an external bus; and a bus arbitrator for arbitrating an external bus using right of a plurality of multimedia modular cards, including said one or more multimedia modular cards, inserted into the device for operating said one or more multimedia modular cards, wherein the device for operating said one or more multimedia modular cards comprises a camera, and the local processor processes a video signal from the camera.

29. An integrated multimedia system having one or more multimedia modular cards being inserted into a device for operating said one or more multimedia modular cards, wherein each of said one or more multimedia modular cards comprises:

a bus interface removably connected to the device for operating said one or more multimedia modular cards, for transmitting/receiving data to/from the device for operating said one or more multimedia modular cards;

a local controller for controlling an operation of said one or more multimedia modular cards, according to an input signal from the bus interface; and a local processor programmed to perform functions corresponding to previously-set multimedia support types, and operated by the local controller; and wherein the device for operating said one or more multimedia modular cards, comprises:

an external bus interface removably connected to said one or more multimedia modular cards, for receiving/transmitting data to/from said one or more multimedia modular cards;

a main controller for generating a signal for controlling said one or more multimedia modular cards through an external bus; and a bus arbitrator for arbitrating an external bus using right of a plurality of multimedia modular cards, including said one or more multimedia modular cards, inserted in the device for operating said one or more multimedia modular cards, wherein the external bus interface comprises:

a plurality of connection ports where said one or more multimedia modular cards are correspondingly inserted; and switch units correspondingly connected to the plurality of connection ports, and turned off when said one or more multimedia modular cards are correspondingly inserted.

30. The integrated multimedia system according to claim 29, wherein, when said one or more multimedia modular cards are correspondingly inserted into the plurality of connection ports, adjacent ones of said one or more multimedia modular cards are connected in a row through signal lines for demanding use of the external bus and signal lines for allowing use of the external bus.

31. The integrated multimedia system according to claim 30, wherein, when at least one of said one or more multimedia modular cards correspondingly inserted into the plurality of connection ports and connected to one another, are removed, at least one of the switch units corresponding to removed said at least one of said one or more multimedia modular cards, is turned on, and at least one of the signal lines connected to the removed said at least one of said one or more multimedia modular cards, are connected to said at least one of the switch units.

32. An integrated multimedia system having one or more multimedia modular cards being inserted into a device for operating said one or more multimedia modular cards, wherein each of said one or more multimedia modular cards comprises:

a bus interface removably connected to the device for operating said one or more multimedia modular cards, for transmitting/receiving data to/from the device for operating said one or more multimedia modular cards;

a local controller for controlling an operation of said one or more multimedia modular. cards, according to an input signal from the bus interface; and a local processor programmed to perform functions corresponding to previously-set multimedia support types, and operated by the local controller; and wherein the device for operating said one or more multimedia modular cards, comprises:

an external bus interface removably connected to said one or more multimedia modular cards, for receiving/transmitting data to/from said one or more multimedia modular cards;

a main controller for generating a signal for controlling said one or more multimedia modular cards through an external bus; and a bus arbitrator for arbitrating an external bus using right of a plurality of multimedia modular cards, including said one or more multimedia modular cards, inserted into the device for operating said one or more multimedia modular cards, wherein, when at least two of said plurality of multimedia modular cards are inserted into the device for operating said one or more multimedia modular cards, one of said at least two of said plurality of multimedia modular cards demands use of the external bus, and performs a master function for controlling another one of said at least two of said plurality of multimedia modular cards.

33. An integrated multimedia system having one or more multimedia modular cards being inserted into a device for operating said one or more multimedia modular cards, wherein each of said one or more multimedia modular cards comprises:

a bus interface removably connected to the device for operating said one or more multimedia modular cards, for transmitting/receiving data to/from the device for operating said one or more multimedia modular cards;

a local controller for controlling an operation of said one or more multimedia modular cards, according to an input signal from the bus interface; and a local processor programmed to perform functions corresponding to previously-set multimedia support types, and operated by the local controller; and wherein the device for operating said one or more multimedia modular cards, comprises:

an external bus interface removably connected to said one or more multimedia modular cards, for receiving/transmitting data to/from said one or more multimedia modular cards;

a main controller for generating a signal for controlling said one or more multimedia modular cards through an external bus; and a bus arbitrator for arbitrating an external bus using right of a plurality of multimedia modular cards, including said one or more multimedia modular cards, inserted into the device for operating said one or more multimedia modular cards wherein, when at least two of said plurality of multimedia modular cards are inserted into the device for operating said one or more multimedia modular cards, one of said at least two of said plurality of multimedia modular cards performs a slave function to be controlled by another of said at least two of said plurality of multimedia modular cards.

* * * * *